United States Patent [19]

Adarraga

[11] 4,223,600

[45] Sep. 23, 1980

[54] CONTINUOUS PRESS AND METHOD FOR PRESSING FRUIT

[75] Inventor: Javier M. R. Adarraga, Logrono, Spain

[73] Assignee: Marrodan Y Rezola, S.A., Logrono, Spain

[21] Appl. No.: 3,928

[22] Filed: Jan. 16, 1979

[30] Foreign Application Priority Data

Jan. 16, 1978 [ES] Spain .............................. 233.279[U]

[51] Int. Cl.$^3$ .......................... A47J 19/02; B30B 9/02

[52] U.S. Cl. ....................................... 100/37; 366/332

[58] Field of Search .......................... 100/37, 145–150, 100/117–122; 366/332, 333; 425/208, 209

[56] References Cited

U.S. PATENT DOCUMENTS

| | | | |
|---|---|---|---|
| 3,035,304 | 5/1962 | Reifenhauser | 100/145 X |
| 3,753,399 | 8/1973 | Dessoris | 100/145 |

*Primary Examiner*—Leonard D. Christian
*Attorney, Agent, or Firm*—Wigman & Cohen

[57] ABSTRACT

A continuous press for pressing grapes and other fruit is disclosed. Within the press chamber there is provided a rotatable screw for moving the material being pressed through the chamber. The screw is axially moved, without rotation, against the material where pressing is carried out.

7 Claims, 1 Drawing Figure

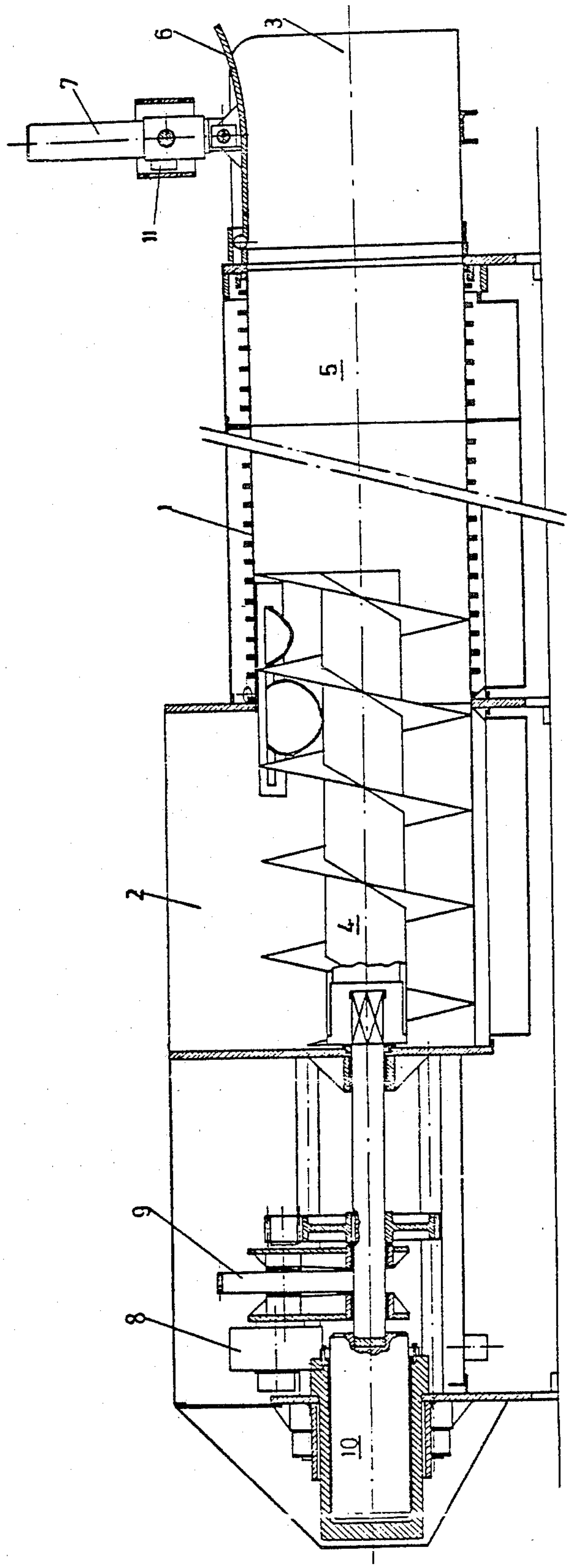
1
2
3
4
5
6
7
8
9
10
11

CONTINUOUS PRESS AND METHOD FOR PRESSING FRUIT

BACKGROUND OF THE INVENTION

The present invention relates to a new continuous press of the kind known as a horizontal screw, especially adapted for pressing grapes, and any other kind of fruit.

SUMMARY OF THE INVENTION

The press, according to the present invention, is provided with a compression chamber inside of which the screw rotates. The compression chamber includes, on one of its sides a hopper which allows a continuous feeding of fruit into the interior of the chamber, and, on its opposite side, a discharge outlet permitting the exit of solids once they have been pressed.

The characteristics of the present press are as follows:

a. The screw not only moves in rotation, but also moves axially inside the chamber, this axial movement being caused by a single-acting hydraulic cylinder between two stops that may be adjusted to determine the end of the course, the return of the screw to its initial position being accomplished after it has been released from the pressure of the hydraulic cylinder by the reaction of the rotating screw. The pressure of the hydraulic cylinder may be adjusted, if desired, so that it will move according to a predetermined course.

b. The outlet piston maintains a constant pressure inside the compression chamber and is provided with an electric valve which is controlled from the hydraulic motor and whose purpose is to prevent the motor form exceeding a specific pressure, thus facilitating the opening of the outlet for discharge.

The operation of the new continuous press includes the following steps:

a. Loading the chamber with fruit by means of the rotating screw.
b. Hydraulic pressing of the loaded fruit by stopping the rotation of the screw and moving the screw axially under the action of the hydraulic piston.
c. Moving the screw backwards by releasing hydraulic fluid to the valve and causing rotation of the screw.
d. Repeating the cycle without interruption.

One of the important features of this new press resides in its ability to press fruit without a rotation of the screw, thereby yielding a final product of improved quality.

BRIEF DESCRIPTION OF THE DRAWING

For a better understanding of the invention, reference is made to the detailed description which follows and to the annexed drawing in which there is depicted, in a single FIGURE, an axial view of the endless press according to the present invention.

DETAILED DESCRIPTION OF A PREFERRED EMBODIMENT

Referring to the FIGURE, it may be seen that the press consists in a cylindrical frame of body 1, made of a grooved sheet. Provided on one side of body 1 is a hopper 2 for feeding, and on the other side, a discharge 3. The material to be pressed enters through the hopper 2 and is moved by the screw 4 that is rotating inside the chamber 5 where it is retained by means of a hinged lid 6 which in turn is operated by the hydraulic cylinder 7.

The rotation of the screw 4 is induced by the hydraulic motor 8 through the device 9 which permits adjustment of the number of revolutions of the axis of the screw. The axial movement of the screw is controlled by the single-acting hydraulic piston 10.

In the hydraulic cylinder 7 of the outlet there is an electric valve 11 which is controlled from the hydraulic motor 8. When the pressure exceeds a certain limit, the lid 6 opens to release the pressed material. In this manner there is realized a fully automatic adjustment of the operation.

Although only preferred embodiments are specifically illustrated and described herein, it will be appreciated that many modification and variations of the present invention are possible in light of the above teachings and within the purview of the appended claims without departing from the spirit and intended scope of the invention.

What is claimed:

1. A continuous press for fruit, especially for grapes comprising:

a compression chamber having inlet means for feeding material thereto and outlet means for discharging pressed material;
a screw arranged in said chamber;
means connected to said screw for rotating said screw in said chamber;
means connected to said screw for axially displacing said screw in said chamber between the inlet and outlet means;
means for controlling the axial displacement of the screw in said chamber; and
means associated with said outlet means for controlling the discharge pressure of the pressed material.

2. The press according to claim 1 wherein said means for controlling the discharge pressure of the pressed material includes closure means for said outlet means and electric valve means connected to said screw rotating means for opening said closure means.

3. The press according to claim 2, wherein said screw rotating means includes a hydraulic motor, said motor being connected to said electric valve means, whereby when the hydraulic pressure of said motor exceeds a predetermined limit, said electric valve means permits opening of the closure means.

4. The press according to claim 1, wherein said screw axial displacement means comprises a hydraulic cylinder, said screw rotating means comprises a hydraulic motor and said means for controlling the discharge pressure of the pressed material includes closure means for said outlet means, a second hydraulic cylinder connected to said closure means and electric valve means connected to said hydraulic motor and said second hydraulic cylinder for opening said closure means when the hydraulic pressure of said motor exceeds a predetermined limit.

5. The press according to claim 1, wherein said screw axial displacement means comprises a single-acting hydraulic cylinder.

6. The press according to claim 1, wherein said outlet means includes a hinged lid.

7. A method of pressing fruit comprising the steps of:

providing a compression chamber having a rotatable and axially reciprocable screw arranged therein;
loading the compression chamber with fruit by rotating said screw;
stopping the rotation of said screw;
pressing said fruit by axially moving said screw into the compression chamber by hydraulic pressure;
releasing the hydraulic pressure on the screw; and
axially moving said screw out of the compression chamber by rotating the screw.

* * * * *